Dec. 1, 1925.
H. A. GOOD
1,563,741
CLUTCH SPEED CHANGING AND REVERSING MECHANISM
Filed Nov. 20, 1922   4 Sheets-Sheet 1
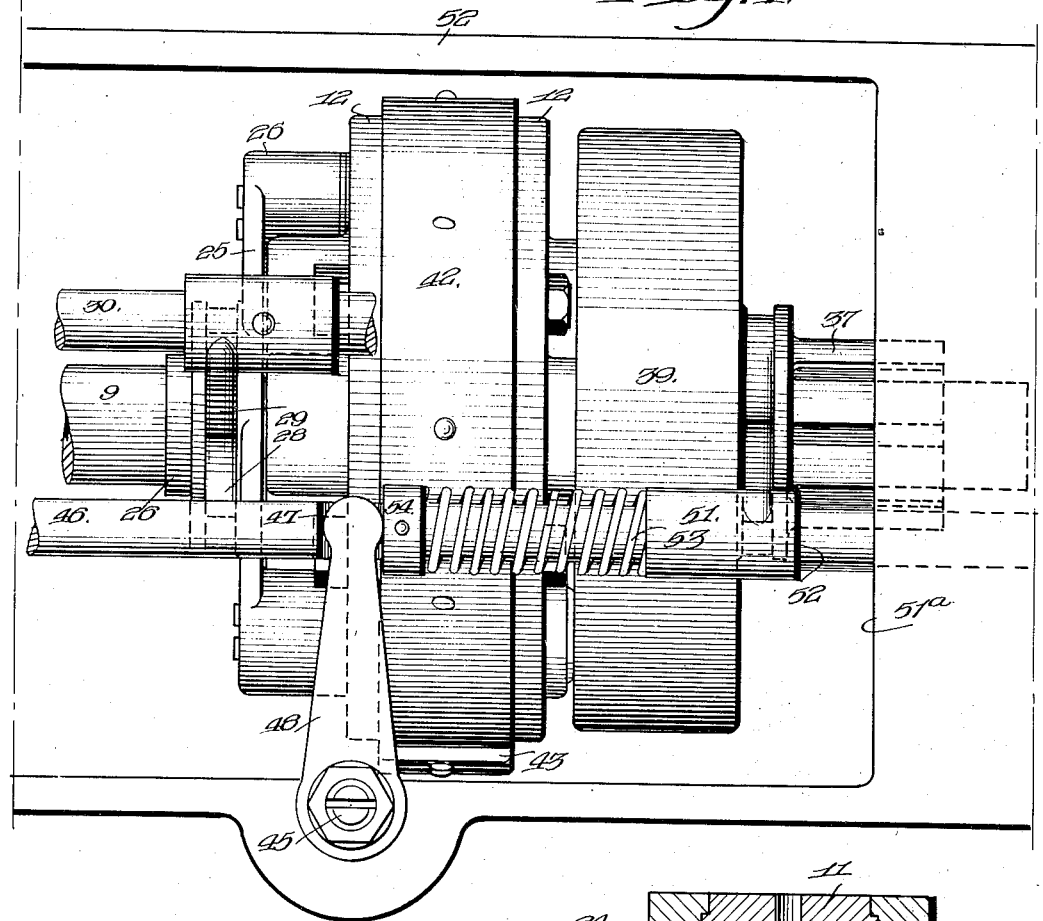
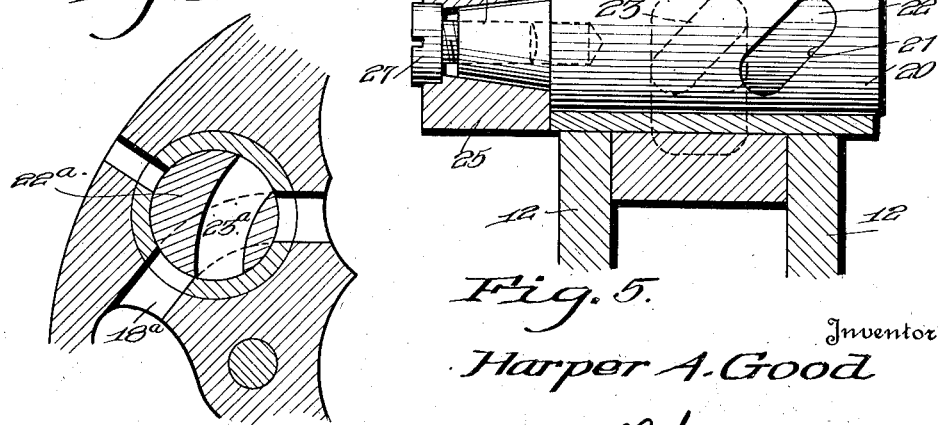
Inventor
Harper A. Good
By
Attorney Dec. 1, 1925.

H. A. GOOD 1,563,741

CLUTCH SPEED CHANGING AND REVERSING MECHANISM

Filed Nov. 20, 1922     4 Sheets-Sheet 2

Inventor
Harper A. Good
by
Attorney

Dec. 1, 1925.
H. A. GOOD
1,563,741
CLUTCH SPEED CHANGING AND REVERSING MECHANISM
Filed Nov. 20, 1922     4 Sheets-Sheet 3
Fig. 3.
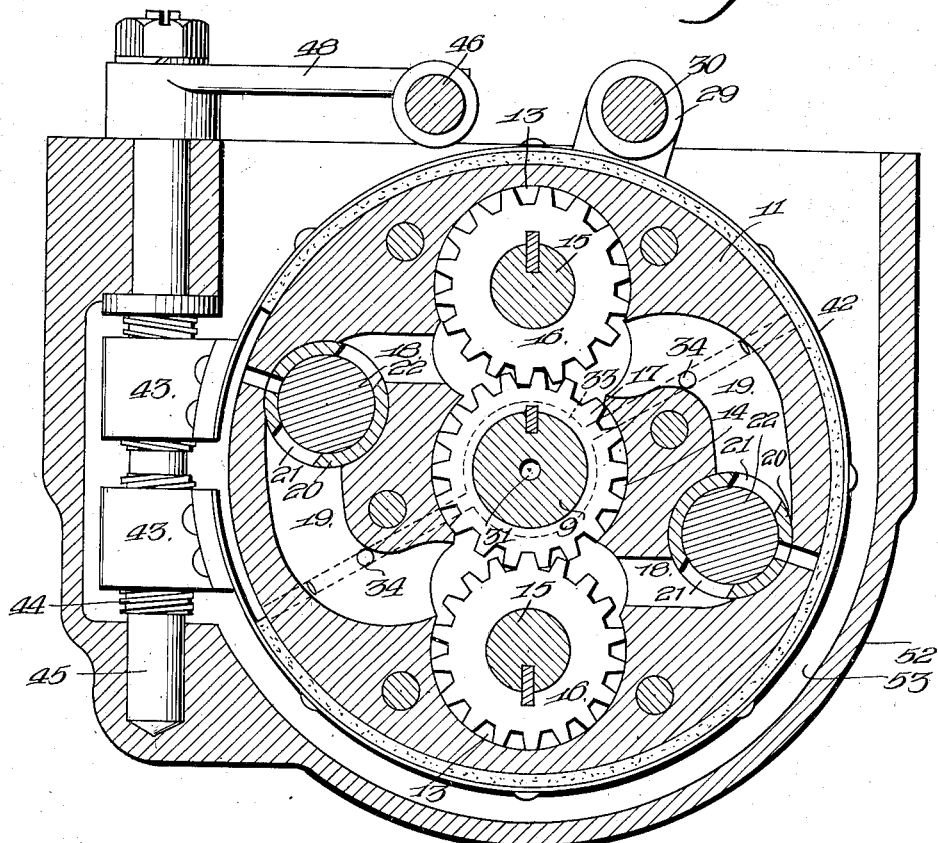
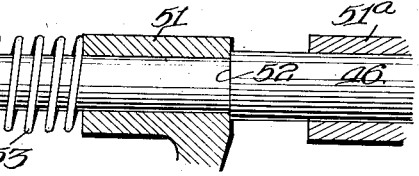
Fig. 6.
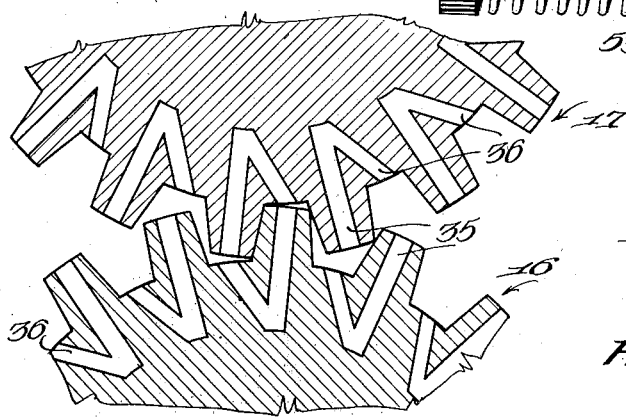
Fig. 4.
Inventor
Harper A. Good
By
Attorney

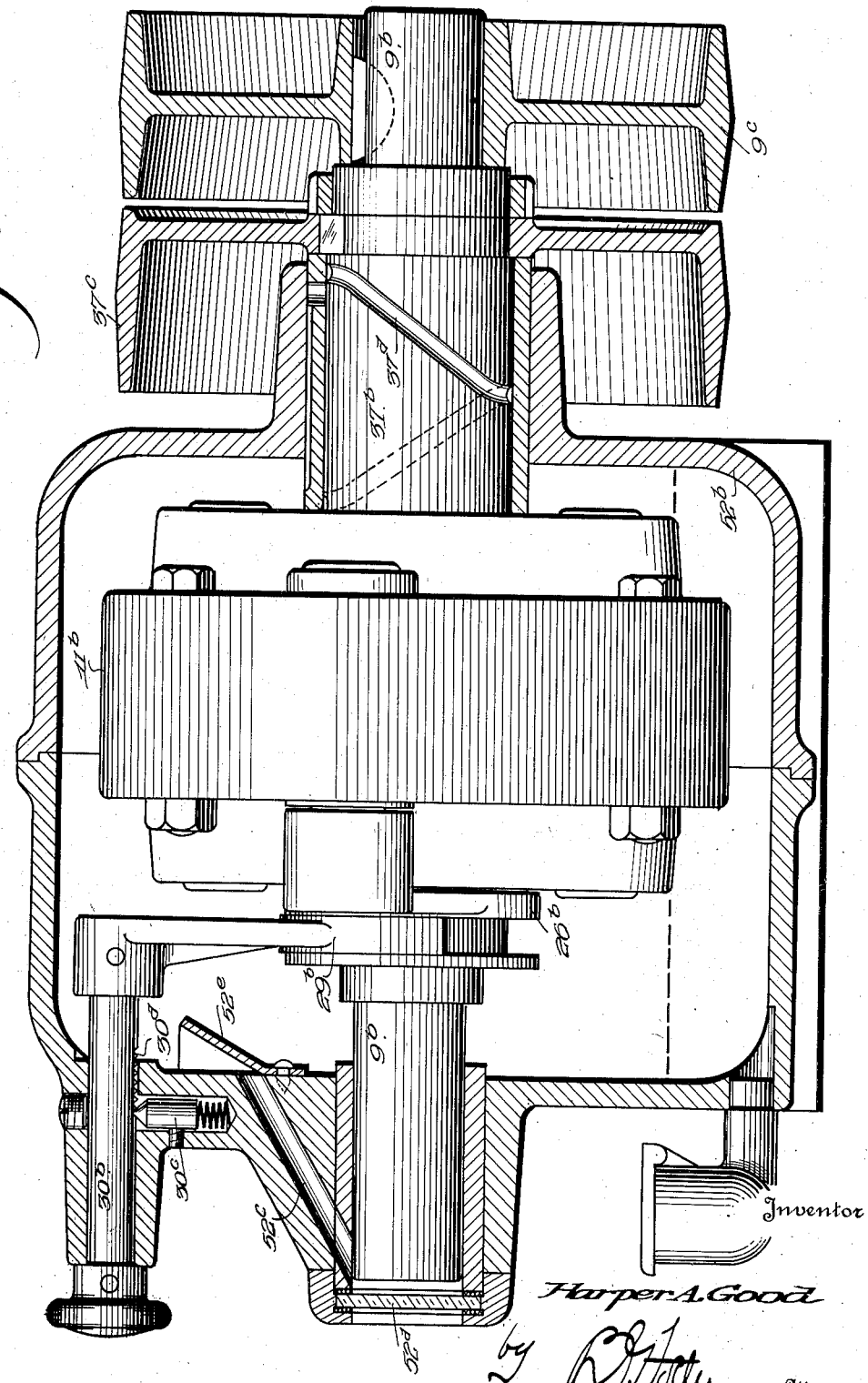

Patented Dec. 1, 1925.

1,563,741

UNITED STATES PATENT OFFICE.

HARPER A. GOOD, OF WAYNESBORO, PENNSYLVANIA.

CLUTCH-SPEED CHANGING AND REVERSING MECHANISM.

Application filed November 20, 1922. Serial No. 602,314.

*To all whom it may concern:*

Be it known that I, HARPER A. GOOD, a citizen of the United States, residing at Waynesboro, in the county of Franklin and State of Pennsylvania, have invented certain new and useful Improvements in Clutch-Speed Changing and Reversing Mechanism, of which the following is a specification.

The present invention relates to fluid controlled speed changing and reversing clutches, and one of the objects is to provide a structure of this character that is properly balanced, and in which the supply of the fluid may be easily maintained. A further and important object is the provision of a novel and effective means for rotating the driven member in opposite directions from a driving member that is rotated constantly in one direction.

The preferred embodiment of the invention is illustrated in the accompanying drawings, wherein:—

Figure 1 is a plan view of the clutch,

Figure 3 is a cross sectional view,

Figure 2:
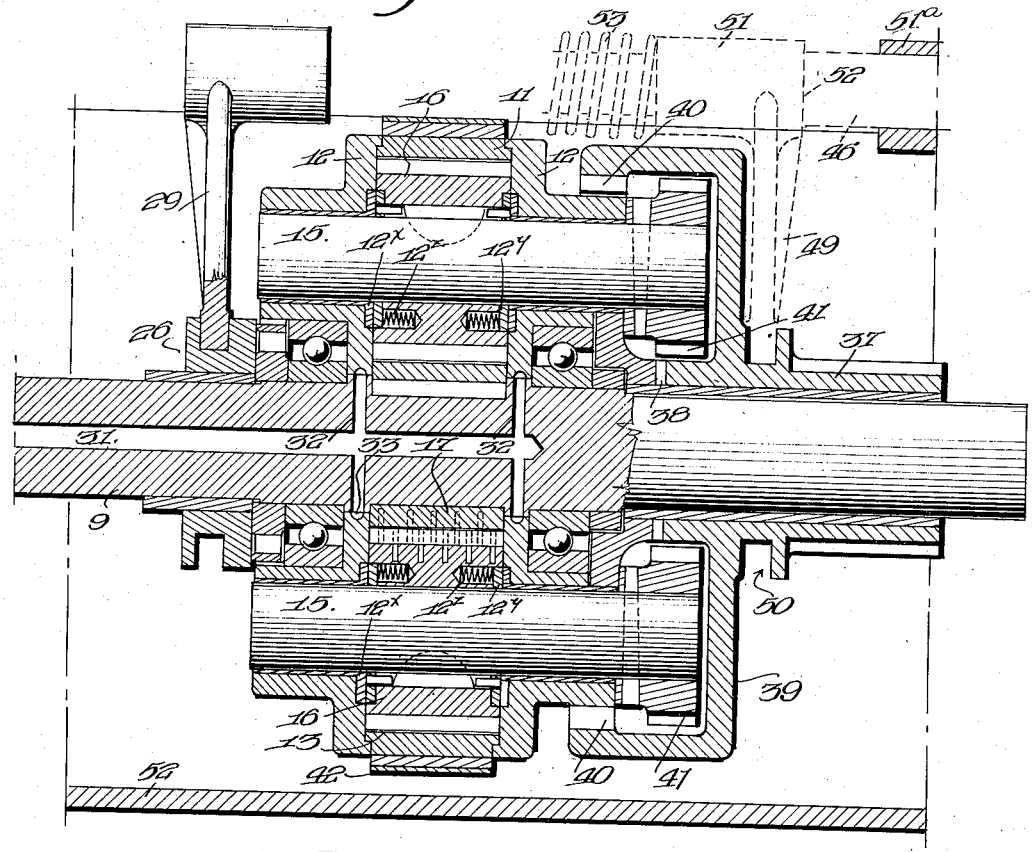
Figure 2 is a longitudinal sectional view.
Figure 7:
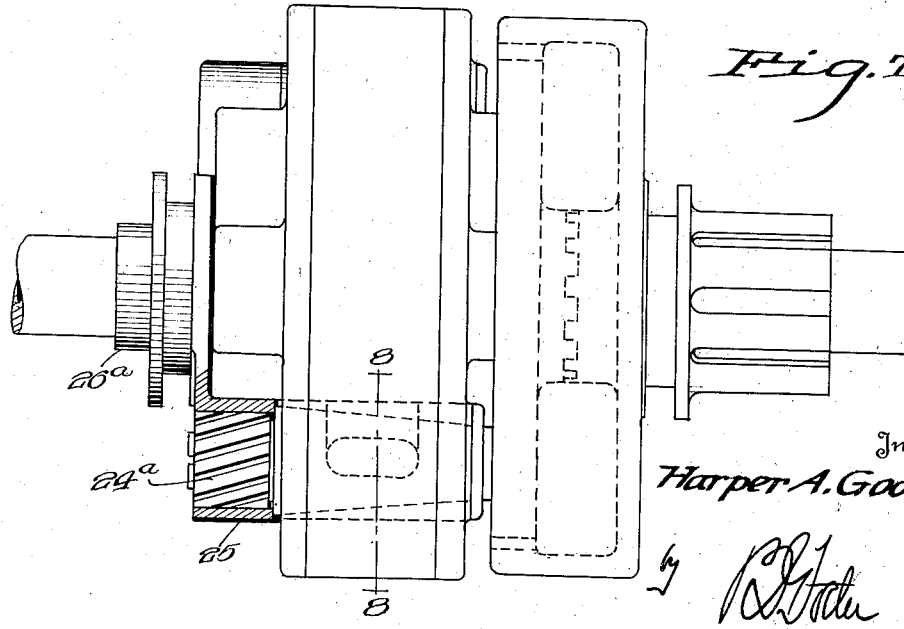

Figure 4 is a detail sectional view through intermeshing portions of the rotor gears, Figure 5 is a detail sectional view showing one of the controlling valves in elevation, Figure 6 is a detail sectional view through the operating means for the gear reversing mechanism, Figure 7 is a view of slightly modified form of construction, Figure 8 is a detail sectional view on the line 8—8 of Figure 7, Figure 9 is a view partly in elevation and partly in section of another embodiment of the invention.

In the embodiment disclosed in Figures 1–6 inclusive, a driving member in the form of a shaft is shown at 9. A head is rotatably mounted on the driving shaft 9 and comprises a peripheral wall 11 and end walls 12, providing diametrically opposite rotor chambers 13 and a central chamber 14.

Journaled in the end walls 12 are shafts 15 carrying rotor gears 16 that are located in the chambers 13. To prevent the leakage of the fluid around the shafts 12 the walls may be provided with bushings $12^x$ and the opposing sides of the gears may have coacting packing washers $12^y$ urged into engagement with the bushings by springs $12^z$. The driving shaft 9 has fixed thereto a central rotor gear 17 that meshes with the rotor gears 16. These rotors thereby produce a duplex rotary pump and leading from the outlet side of each to the intake side of the other, are passageways 18, portions of which are preferably enlarged, as illustrated at 19, to provide reservoirs.

In the passageways are located transverse shells 20 having oppositely disposed ports 21 and containing slide valves 22. As illustrated particularly in Figure 5 these valves have diagonal ports 23, the diagonal disposition serving to provide relatively great cross sectional area and these valves have tapered ends 24 fitted in the arms 25 of a spider 26 that is slidably mounted on the driving shaft 9. Preferably holding screws 27 serve to hold the tapered ends in place. The spider has a grooved portion 28 engaged by a yoke 29 carried by a longitudinally slidable operating rod 30.

In order to supply fluid to the passageways 18, the driving shaft 9 has an axial bore 31 that terminates short of the inner end of said shaft and is provided with lateral ports 32. These ports lead to annular grooves 33 formed in the end walls 12, and from said grooves ports 34 open into the reservoirs 19. In order to prevent the rotor gears from trapping oil in the interdental spaces where the teeth mesh, as illustrated in Figure 4, these teeth preferably have relief ports 35 opening through their ends, and communicating with ports 36 that open into said interdental spaces at one side of the same.

A driven member in the form of a sleeve 37 is employed that is rotatable and slidable upon the driving shaft 9 and is provided with clutch teeth adapted to move into and out of mesh with the clutch teeth on the adjacent end wall 12 of the head, these teeth being indicated at 38. When so clutched, it will be evident that the head 11—12 is fixed with respect to the driven member 37. The sleeve 37 is furthermore provided with a hooded portion 39 having an internal gear 40, and the shafts 15 project into said hooded portion, being provided on their projecting ends with pinions 41 with which the internal gear 40 may be made to mesh, when the sleeve 37 is moved horizontally to unclutch the head 12. The peripheral wall 11 of the head constitutes a brake surface, and coacting therewith is a brake band 42, the ends of this band being provided with nuts 43 oppositely threaded and engaged by the opposite threads 44 of an upright shaft 45.

Common means are provided for actuating the clutch gear and the shaft 45. This actuating means consists of a longitudinally movable rod 46 having a recessed seat 47 that receives the free end of a crank arm 48 fixed to the upper end of the shaft 45. A yoke 49 engaged in a groove 50 of the sleeve 37 has a collar 51 in which the actuating rod 46 has a limited sliding movement, said rod being provided with a stop shoulder 52 against which the collar 51 is normally held abutted by a coiled spring 53 that bears against the opposite end of said collar and against a collar 54 secured to the actuating rod 46.

The operation of the structure is as follows: Assuming the driving shaft 9 as rotating and the valves 22 as open, it will be evident that the rotors 16—17 will rotate freely inasmuch as the fluid can circulate without resistance through the passageways 18—19. Consequently the head 12 will remain stationary. If, however, the valves 22 are gradually closed a corresponding increase in resistance to the rotation of the gears 16—17 will be created, causing a rotation of the head at variable rates of speed as desired. When said valves 22 are completely closed, it being impossible for the said gears to rotate the head will be rotated at the speed of the shaft 9. If, now, said head is clutched to the driven member 37 corresponding rotation will obviously be transmitted to the latter. The supply of fluid, preferably oil, to the circulatory system can be maintained through the passageway 31 for the rotation of the parts will tend to throw this oil outwardly by the action of centrifugal force and thus maintain a proper body of fluid in said system.

If it is desired to rotate the driven member 37 in an opposite direction to the shaft 9, the collar 37 is moved away from the head. This will cause the unclutching of the sleeve 37 from the head and will bring the gears 41 into mesh with the internal gears 40. At the same time the brake band 42 is applied to the head so as to hold the latter against rotation. This is accomplished by moving the rod 46. The first action of this movement will be to cause the movement of the yoke 49 until the collar 51 is abutted against the stop 51ª shown in Figure 2. When so positioned the driven member 37 is unclutched from the head and the internal gear 40 is in mesh with the gears 41. A continued movement of the rod will cause a continued swinging of the crank arm 48, which operating the shaft 45, will cause the brake band to be compressed upon the peripheral wall 11 of the head. The mechanism is mounted in a casing 52 having an oil well 53 in which the parts are located.

The modification illustrated in Figures 7 and 8 is the same as that described, with the exception of the valve mechanism. In this modification rotary valves 22ª are employed having ports 23ª that are movable into and out of communication with the passageway 18ª. The valves are provided on their exposed ends with gears having diagonal teeth 24ª, and these teeth mesh with corresponding teeth formed in the arms 25ª of a spider 26ª. By moving this spider toward and from the head, obviously the valves will be rotated to opened or closed position.

In the embodiment disclosed in Figure 9 the same internal mechanism is employed, as above described, with the exception of the reversing gear, the object being to provide a variable speed driving mechanism and clutch of a simple character and of wide application. In this embodiment the casing is shown at 52ᵇ and the driving shaft 9ᵇ, extending through said casing 52ᵇ, carries the head 11ᵇ located within the casing. The actuating spider for the valves is shown at 26ᵇ and is operated by a yoke 29ᵇ carried by an actuating rod 30ᵇ that may be held in any of a variety of positions by a spring-pressed dog 30ᶜ adapted to engage in different notches 30ᵈ formed in the rod 30ᵇ. The driven member or sleeve is shown at 37ᵇ and carries a driven pulley or other power-transmitting element 37ᶜ. The driving shaft 9ᵇ, which projects beyond the driven member, is provided with a driving pulley 9ᶜ. It will be noted that the driven member 37ᵇ is provided with suitable oil grooves 37ᵈ and that the inner end of the driving shaft 9ᵇ is supplied with lubricant through a passageway 52ᶜ leading to the end of the shaft, said end being preferably in view through a transparent wall 52ᵈ. Lubricant is supplied to the passageway 52ᶜ from a receiving cup 52ᵉ, and oil is delivered thereto by the splash from the revolving head 11ᵇ.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is—

1. A fluid clutch comprising relatively rotatable driving and driven members, a head having a rotor chamber in one of the members, a rotor in said chamber having a gear, a rotor carried by one of the members and coacting with the first rotor to constitute a pump, a circulating passageway in the head having an intake and discharge communicating with said pump, means for controlling the flow of fluid through the passageway, a gear driven by the first rotor, a gear connected to the other member and shiftable into and out of mesh with the rotor driven gear, and a clutch operable with the shiftable gear to connect and disconnect the head and second member.

2. A fluid clutch comprising relatively rotatable driving and driven members, a head having a rotor chamber in one of the members, a rotor in said chamber having a gear, a rotor carried by one of the members and coacting with the first rotor to constitute a pump, a circulating passageway in the head having an intake and discharge communicating with said pump, means for controlling the flow of fluid through the passageway, a gear driven by the first rotor, a gear connected to the other member and shiftable into and out of mesh with the rotor driven gear, a clutch operable with the shiftable gear to connect and disconnect the head and second member, a brake for the head, and means for operating the brake and shifting the gear.

3. A fluid clutch comprising relatively rotatable driving and driven members, a head having a rotor chamber in one of the members, a rotor in said chamber having a gear, a rotor carried by one of the members and coacting with the first rotor to constitute a pump, a circulating passageway in the head having an intake and discharge communicating with said pump, means for controlling the flow of fluid through the passageway, a gear driven by the first rotor, a gear connected to the other member and shiftable into and out of mesh with the rotor driven gear, a clutch operable with the shiftable gear to connect and disconnect the head and second member, a brake for the head, and common means for operating the brake, shifting the gear and actuating the clutch.

4. A fluid clutch comprising alined driving and driven members, a head rotatable with respect to both members, a gear rotor carried by one of the members, a gear rotor journaled in the head and meshing with said first gear rotor, means for opposing a variable fluid resistance to the gears, a gear shiftable on the other member and having a clutch movable therewith, into and out of coaction with the head, a brake for the head, an actuating device having a yielding operating connection with the gear clutch, and an operating connection with the brake.

5. In a fluid clutch, the combination with driving and driven members, of a head rotatable with one of the members, a rotor gear journaled in the head, a rotor gear carried by the other member and meshing with the first gear, means for permitting a circulation of fluid within the head by the coacting rotor gears, and means for controlling said circulation, the teeth of said rotor gears having relief ports therein that afford communication between the interdental spaces of the gears and the circulation permitting means.

In testimony whereof I affix my signature.

HARPER A. GOOD.